United States Patent
Choi

[11] Patent Number: 5,801,468
[45] Date of Patent: Sep. 1, 1998

[54] REAR BEARING CREEP PREVENTION APPARATUS FOR VEHICLE AC GENERATOR

[75] Inventor: Myung-Shick Choi, Kyongsangbuk-do, Rep. of Korea

[73] Assignee: Mando Machinery Corporation, Kyonggi-do, Rep. of Korea

[21] Appl. No.: 716,956

[22] Filed: Sep. 20, 1996

[30] Foreign Application Priority Data

Apr. 17, 1996 [KR] Rep. of Korea ............... 1996 11607

[51] Int. Cl.$^6$ ............... H02K 7/08; F16C 27/00
[52] U.S. Cl. ............... 310/90; 310/91; 384/535; 384/581; 384/215
[58] Field of Search ............... 310/90, 91; 384/535, 384/581, 215

[56] References Cited

U.S. PATENT DOCUMENTS 3,061,386 10/1962 Dix et al. ............... 384/535
3,467,451 9/1969 Marley ............... 384/581
4,659,950 4/1987 Gotoh ............... 310/59
4,739,204 4/1988 Kitamura et al. ............... 310/68 D Primary Examiner—Thomas M. Dougherty
Assistant Examiner—Timothy A. Williams
Attorney, Agent, or Firm—Bryan Cave LLP

[57] ABSTRACT

An improved alternating current generator for a vehicle which is directed to forming a plurality of inserting holes of the rear bracket by concurrently forming the same during a die-casting process or by forming the same during a subsequent process, which includes a plurality of elastic plates spaced-apart from one another at a predetermined interval at the rear bracket so as to prevent a creep phenomenon by elastically supporting an outer circumferential portion of the rear bearing wherein a rear bearing creep prevention apparatus for an alternating current generator for a vehicle comprises a stator fixedly inserted at front and rear brackets; and a rotor supported by a shaft in cooperation with the front and rear bearings assembled at the front and rear brackets to be opposite to a core of the stator and being rotatable by a driving force transferred from an engine.

13 Claims, 1 Drawing Sheet

REAR BEARING CREEP PREVENTION APPARATUS FOR VEHICLE AC GENERATOR

BACKGROUND OF THE INVENTION

1. Field of the Invention

The present invention relates to a rear bearing creep prevention apparatus for an alternating current generator for a vehicle, and particularly to an improved rear bearing creep prevention apparatus for an alternating current generator for a vehicle which is capable of preventing a creep phenomenon of a rear bearing by elastically supporting an outer circumferential surface of a rear bearing by arranging a plurality of semicircular-shaped elastic plates at an angle of 120° or 90° at a regular interval, thus increasing the life span of the system and preventing the occurrence of noise.

2. Description of the Conventional Art

Generally, an alternating current generator for a vehicle includes a stator fixedly inserted into a bracket, and a rotor supported by a bearing assembly arranged at a bearing box unit of a bracket to be opposite to a core of the stator.

The rotor includes a pulley disposed at the bearing assembly fixed to a front bracket and a rear bracket and being rotatable by receiving a driving force of an engine of the system.

The outer portion of the front bearing is tightly inserted into the bearing box of the front bracket, and the outer portion of the rear bearing is smoothly inserted into the bearing box in order for the same to be axially movable when assembling the system.

Since the rear bearing is smoothly inserted into the bearing box of the rear bracket, there occurs a heat due to the movements of the bearing balls therebetween during the operation of the alternating current generator, and there occurs a slip of the rear bearing in the bearing box due to the thusly generated heat and the rapid driving force changes caused by the rapid speed-up or speed-down of the generator, thus causing creeps therein which denotes a free rotation between the outer circumferential surface of the bearing and the inner circumferential surface of the bracket.

Namely, in the conventional alternating current generator for a vehicle, the rotor is rapidly speeded-up and speeded-down during the operation of the system and is vibrated by the vibration of the engine. In addition, the rotor is applied with a lot of torque which is varied by the electrical load applied thereto. The rear brake is axially movable by receiving the assembly tolerance which occurs in the axial direction, so a smooth assembly between the bearing box of the rear bracket and the outer circumferential surface of the bearing is made.

However, due to the vibration due to the compact size of the engine, the thermal expansion of the bearing box due to the heat or the like which occurs at the engine or the generator, and the rapid speed-up and speed-down of the rotor, the outer circumferential surface of the rear bearing is slipped in the bearing box, thus causing the creep of the bearing. In order to prevent the above-mentioned problems, recently, a function for preventing the creep was introduced in the industry. This function has been adapted to the rear bearing of the alternating current generator.

However, the above-mentioned newly introduced function has also problems in that the thermal expansion occurs in the bearing box of the bracket due to the heat generated by the engine and the generator during the operation of the alternating current generator, and there occurs the creep of the bearing due to the slip in the bearing box caused by the rapid speed-up and speed-down of the rotation force of the engine and the slip of the bearing in the bracket beating box, thus over-heating the bearing, so that the rotor which is supported by the bearing may be deviated from its rotation path due to a predetermined force generated by the damage of the bearing and the pulley, thus degrading the performance of the system operation due to the above-mentioned problems and the interference between the stator and the rotor.

In addition, so as to overcome the above-mentioned problems, a method was introduced in the industry. Namely, this method is directed to arranging an elastic ring or an elastic plastic band which has different thermal expansion at the outer circumferential surface of the bearing or to assembling the rear bearing after inserting the plastic cover into the bearing box. However, the construction of the same is so complicated, thus increasing the fabrication cost. Thus, the total fabrication cost is high.

SUMMARY OF THE INVENTION

Accordingly, it is an object of the present invention to provide an improved rear bearing creep prevention apparatus for an alternating current generator for a vehicle which overcomes the problems encountered in the conventional alternating current generator for a vehicle.

It is another object of the present invention to provide a rear bearing creep prevention apparatus for an alternating current generator for a vehicle by which it is possible to prevent a creep phenomenon of a rear bearing by elastically supporting an outer circumferential surface of a rear bearing by arranging a plurality of semicircular-shaped elastic plates at an angle of 120° or 90° at a regular interval, thus increasing the life span of the system and preventing the occurrence of noise.

It is still another object of the present invention to provide a rear bearing creep prevention apparatus for an alternating current generator for a vehicle which is directed to arranging a plurality of elastic plates at a predetermined interval at a rear bracket so as to prevent a creep phenomenon by elastically supporting the outer circumferential surface of the rear bearing.

It is still another object of the present invention to provide a rear bearing creep prevention apparatus for an alternating current generator for a vehicle which is directed to a plurality of elastic plates at 120° or 90°, so that a predetermined curved portion or a predetermined semicircular-shaped portion of the same is protruded within the rear bracket.

It is still another object of the present invention to provide a rear bearing creep prevention apparatus for an alternating current generator for a vehicle which is directed to forming a plurality of elastic plates using an elastic metallic material or a plastic which has a desired elastic property, an excellent thermal characteristic, and a low thermal deformation coefficient.

It is still another object of the present invention to provide a rear bearing creep prevention apparatus for an alternating current generator for a vehicle which is directed to forming a plurality of inserting holes for receiving thereinto a plurality of elastic plates.

It is still another object of the present invention to provide a rear bearing creep prevention apparatus for an alternating current generator for a vehicle which is directed to forming a plurality of inserting holes of the rear bracket by concurrently forming the same during a die-casting process or by forming the same during a subsequent process.

3

To achieve the above objects, there is provided a rear bearing creep prevention apparatus for an alternating current generator for a vehicle which includes a plurality of elastic plates spaced-apart from one another at a predetermined interval at the rear bracket so as to prevent a creep phenomenon by elastically supporting an outer circumferential portion of the rear bearing wherein a rear bearing creep prevention apparatus for an alternating current generator for a vehicle comprises a stator fixedly inserted at front and rear brackets; and a rotor supported by a shaft in cooperation with the front and rear bearings assembled at the front and rear brackets to be opposite to a core of the stator and being rotatable by a driving force transferred from an engine.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
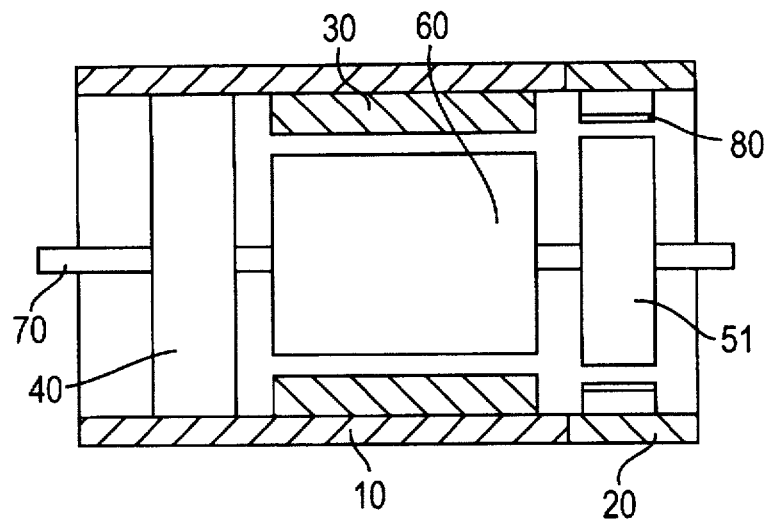
FIG. 1 is a cross-sectional view of an alternating current generator according to the present invention.
Figure 2:
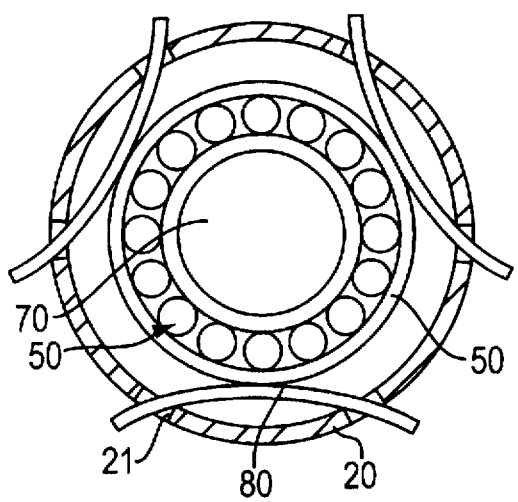
FIG. 2 is a side cross-sectional view of a major portion of an alternating current generator according to the present invention.

FIG. 1 is a cross-sectional view of an alternating current generator, and FIG. 2 is a side cross-sectional view of a major portion of the same according to the present invention.

As shown therein, the rear bearing creep prevention apparatus for an alternating current generator for a vehicle according to the present invention includes a stator 30 fixedly inserted to front bracket 10 and rear bracket 20, and a rotor 60 which is supported by a shaft 70 in cooperation with front bearing 40 and rear bearing 50 assembled in the front and rear brackets 10 and 20 to be opposite to the core of the stator 30 and is movable in accordance with a driving force transferred from the engine of the system.

A plurality of elastic plates 80 support the outer circumferential surface portion 51 of the rear bearing 50 at a predetermined interval from one another which is defined at the rear bracket 20, and thus a rear bearing creep prevention apparatus of an alternating current generator for a vehicle is formed.

The elastic plates 80 are regularly arranged at 120° or 90°, and a predetermined portion of the same is inwardly protruded into the inside of the bracket 20 in a curved shape or a semicircular shape.

The elastic plates 80 are formed of an elastic metallic material or a plastic material having a desired thermal characteristic and a low heat deformation coefficient.

The rear bracket 20 includes a plurality of regularly spaced-apart inserting holes 21 into which each elastic plate 80 is inserted, and both ends of the same are outwardly protruded beyond the outer circumferential surface of the rear bracket 20.

4

The inserting holes 21 of the rear bracket 20 are formed when molding the system. In addition, the same may be formed during the die-casting process.

Namely, the rear bearing creep prevention apparatus for an alternating current generator for a vehicle according to the present invention basically includes the rotor 60 supported by the bearings 40 and 50 assembled in the bearing box of the brackets 10 and 20, and the stator 30 supported by the inner circumferential surface of the brackets 10 and 20. The thermal expansion coefficient of the bearing box of the rear bracket 20 is different from the bracket, and the both ends of the semicircular-shaped elastic plate 80 having a low thermal expansion and a desired elastic force are inserted into the inserting holes 21 of the rear bracket 20, and then the elastic plate is regularly spaced-apart from one another at 120°. The rear bearing 50 assembled at the shaft 70 of the rotor 60 is assembled to be inserted into the inside of the bearing box in order for the outer circumferential surface portion 51 to be elastically supported by the plurality of the elastic plates 80, thus preventing the creep of the bearing by preventing the slip between the rear bearing 50 and the rear bracket 20 of the alternating current generator for a vehicle.

In more detail, the rear bearing 50 assembled at the shaft 70 of the rotor 60 is assembled after the semicircular-shaped elastic plates 80 are inserted into the inserting holes formed at the bearing box of the rear bracket 20. Therefore, the conventional art has the problems in that the bracket is heat-expanded due to the vibration and the heat, and thus the creep of the bearing occurs. By contrast, in the present invention, since the outer circumferential surface portion 51 of the rear bearing 50 is supported by the elastic plates 80 inserted into the inserting holes 21 of the rear bracket 20, and the elastic plates 80 absorbs the vibration of the engine is not affected from the heat expansion, it is possible to prevent a slip or noise between the rear bearing 50 and the bearing box of the rear bracket 20, thus elongating the life span of the system.

In the present invention, since the outer circumferential surface portion of the rear bearing 50 is supported by the semicircular-shaped elastic plates 80 inserted into the inserting holes 21 at 120° at the periphery of the rear bracket 20, it is possible to molding the inserting holes 21 and the rear bracket 20, thus reducing the fabrication cost of the products.

In according to another embodiment of the present invention, the motor or common generator may include a rotor and a stator. The rotor is rotated in cooperation with the pulley, and then the slip between the bearing and the bearing box. The construction covering the above-mentioned elements may be included in this embodiment.

As described above, the rear bearing creep prevention apparatus for an alternating current generator for a vehicle according to the present invention is directed to arranging a plurality of semicircular-shaped elastic plates at 120° or 90° at the rear bracket and then supporting the outer circumferential surface portion of the rear bearing, thus elongating the life span of the rear bearing and the system and reducing the noise of the bearings in the system.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A rear bearing creep prevention apparatus for a vehicle AC generator, the vehicle AC generator comprising a stator fixedly supported at front and rear brackets, and a rotor mounted on a shaft opposite a core of the stator, the shaft being supported by front and rear bearings in the front and rear brackets respectively, the rotor being rotatable by a driving force transferred from an engine, the rear bearing creep prevention apparatus comprising:

a plurality of elastic plates spaced-apart by a predetermined interval elastically supporting an outer circumferential portion of the rear bearing in the rear bracket, the elastic plates being formed of an elastic plastic having desired thermal characteristic and a low thermal deformation coefficient.

2. The apparatus of claim 1, wherein the predetermined interval is 120°.

3. The apparatus of claim 1, wherein the predetermined interval is 90°.

4. The apparatus of claim 1, wherein each elastic plate comprises a curved portion on the interior of the rear bracket.

5. The apparatus of claim 1, wherein each elastic plated comprises a semicircular-shaped portion on the interior of the rear bracket.

6. The apparatus of claim 1, wherein the rear bracket comprises a plurality of insertion holes therethrough, and each elastic plate comprises ends, the ends of the elastic plates extending through the insertion holes.

7. A rear bearing creep prevention apparatus for vehicle AC generator, the vehicle Ac generator comprising a stator fixedly supported at front and rear brackets, and a rotor mounted on a shaft opposite a core of the stator, the shaft being supported by front and rear bearings in the front and rear brackets respectively, the rotor being rotatable by a driving force transferred from an engine, the rear bearing creep prevention apparatus comprising:

plurality of insertion holes extending through the rear bracket; and a plurality of elastic plates spaced-apart by a predetermined interval elastically supporting an outer circumferential portion of the rear bearing in the rear bracket, each elastic plate comprising ends, the ends of the elastic plates extending through the insertion holes.

8. The apparatus of claim 1, wherein the predetermined interval is 120°.

9. The apparatus of claim 1, wherein the predetermined interval is 90°.

10. The apparatus of claim 1, wherein each elastic plate comprises a curved portion on the interior of the rear bracket.

11. The apparatus of claim 1, wherein each elastic plate comprises a semicircular-shaped portion on the interior of the rear bracket.

12. The apparatus of claim 1, wherein each elastic plate is formed of an elastic metallic material.

13. The apparatus of claim 1, wherein each elastic plate is formed of an elastic plastic having a desired thermal characteristic and a low thermal deformation coefficient.

* * * * *